(12) United States Patent
Boucharel et al.

(10) Patent No.: US 10,131,298 B2
(45) Date of Patent: Nov. 20, 2018

(54) CONTROLLED CONNECTION OF MULTIPLE WIRING SYSTEM BRANCHES OF A VEHICLE

(71) Applicant: Continental Automotive GmbH, Hannover (DE)

(72) Inventors: Paul Boucharel, Toulouse (FR); Sergio Perez Guillen, Regensburg (DE); Dirk Reichow, Wenzenbach (DE); Damien Verdier, Toulouse (FR)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 308 days.

(21) Appl. No.: 15/104,097

(22) PCT Filed: Feb. 17, 2015

(86) PCT No.: PCT/EP2015/053304
§ 371 (c)(1),
(2) Date: Jun. 13, 2016

(87) PCT Pub. No.: WO2015/124560
PCT Pub. Date: Aug. 27, 2015

(65) Prior Publication Data
US 2016/0368437 A1    Dec. 22, 2016

(30) Foreign Application Priority Data

Feb. 19, 2014  (DE) .................. 10 2014 203 030

(51) Int. Cl.
*B60R 16/03* (2006.01)
*H02J 7/16* (2006.01)

(52) U.S. Cl.
CPC .............. *B60R 16/03* (2013.01); *H02J 7/166* (2013.01)

(58) Field of Classification Search
CPC ................................ B60R 16/03; H02J 7/166
See application file for complete search history.

(56) References Cited

U.S. PATENT DOCUMENTS 6,229,279 B1    5/2001    Dierker .................... 320/104
6,232,674 B1    5/2001    Frey et al. ............... 307/10.1
(Continued)

FOREIGN PATENT DOCUMENTS

DE    19645944 A1    5/1998    ........... B60R 16/033
DE    19842657 A1    3/2000    ............... H02J 7/00
(Continued)

OTHER PUBLICATIONS

German Office Action, Application No. 102014203030.7, 6 pages, dated Nov. 5, 2014.
(Continued)

*Primary Examiner* — Robert Deberadinis
(74) *Attorney, Agent, or Firm* — Slayden Grubert Beard PLLC

(57) ABSTRACT

The present disclosure teaches a control unit for the exchange of electrical power between a first, a second, a third, and a fourth wiring system branch of a wiring system of a vehicle. The control unit may include a first switching device, a second switching device, a third switching device, and a first, second, third, and fourth terminal configured for connection to the first, second, third and fourth wiring system branches respectively. The first switching device may be connected between the first terminal and the fourth terminal. The second switching device may be connected between the fourth terminal and the third terminal. The third switching device may be connected between the second terminal and the third terminal.

12 Claims, 1 Drawing Sheet

(56) References Cited

U.S. PATENT DOCUMENTS

| | | | |
|---|---|---|---|
| 6,304,054 B1 | 10/2001 | Granberg et al. | 320/104 |
| 6,765,312 B1 | 7/2004 | Urlass et al. | 307/10.1 |
| 7,236,893 B2 | 6/2007 | Gross et al. | 702/57 |
| 2005/0275289 A1 | 12/2005 | Jabaji et al. | 307/10.1 |
| 2008/0238194 A1 | 10/2008 | Treguer | 307/10.1 |
| 2013/0229049 A1 | 9/2013 | Larsson et al. | 307/9.1 |
| 2014/0368160 A1 | 12/2014 | Reichow et al. | 320/107 |
| 2015/0115707 A1 | 4/2015 | Reichow et al. | 307/10.1 |

FOREIGN PATENT DOCUMENTS

| | | | | |
|---|---|---|---|---|
| DE | 19955721 A1 | 5/2001 | | H02J 7/14 |
| DE | 10231517 B4 | 2/2005 | | H02J 1/08 |
| DE | 102004038527 A1 | 3/2006 | | B60R 16/04 |
| DE | 69935831 T2 | 8/2007 | | B60R 16/02 |
| DE | 102008054885 A1 | 6/2010 | | B60R 16/03 |
| DE | 102009012847 A1 | 9/2010 | | B60W 30/18 |
| DE | 102009041006 A1 | 3/2011 | | B60R 16/03 |
| DE | 102011083582 A1 | 3/2013 | | B60R 16/03 |
| DE | 102012200804 A1 | 7/2013 | | B60R 16/03 |
| DE | 102012203467 A1 | 9/2013 | | B60L 11/18 |
| EP | 2272722 A2 | 1/2011 | | B60R 16/033 |
| EP | 2615297 B1 | 2/2015 | | B60R 16/033 |
| FR | 2729901 A1 | 8/1996 | | H02J 7/14 |
| GB | 2488968 A | 9/2012 | | B60W 10/26 |
| JP | 2004266888 A | 9/2004 | | B60L 7/10 |
| WO | 2003/105330 A2 | 12/2003 | | B60R 16/03 |
| WO | 2010/076169 A1 | 7/2010 | | F02N 11/08 |
| WO | 2011/147729 A2 | 12/2011 | | B60W 10/08 |
| WO | 2015/124560 A1 | 8/2015 | | B60R 16/03 |

OTHER PUBLICATIONS

International Search Report and Written Opinion, Application No. PCT/EP2015/053304, 12 pages, dated Jun. 5, 2015.

Japanese Office Action, Application No. 2016561084, 4 pages, dated Jul. 3, 2017.

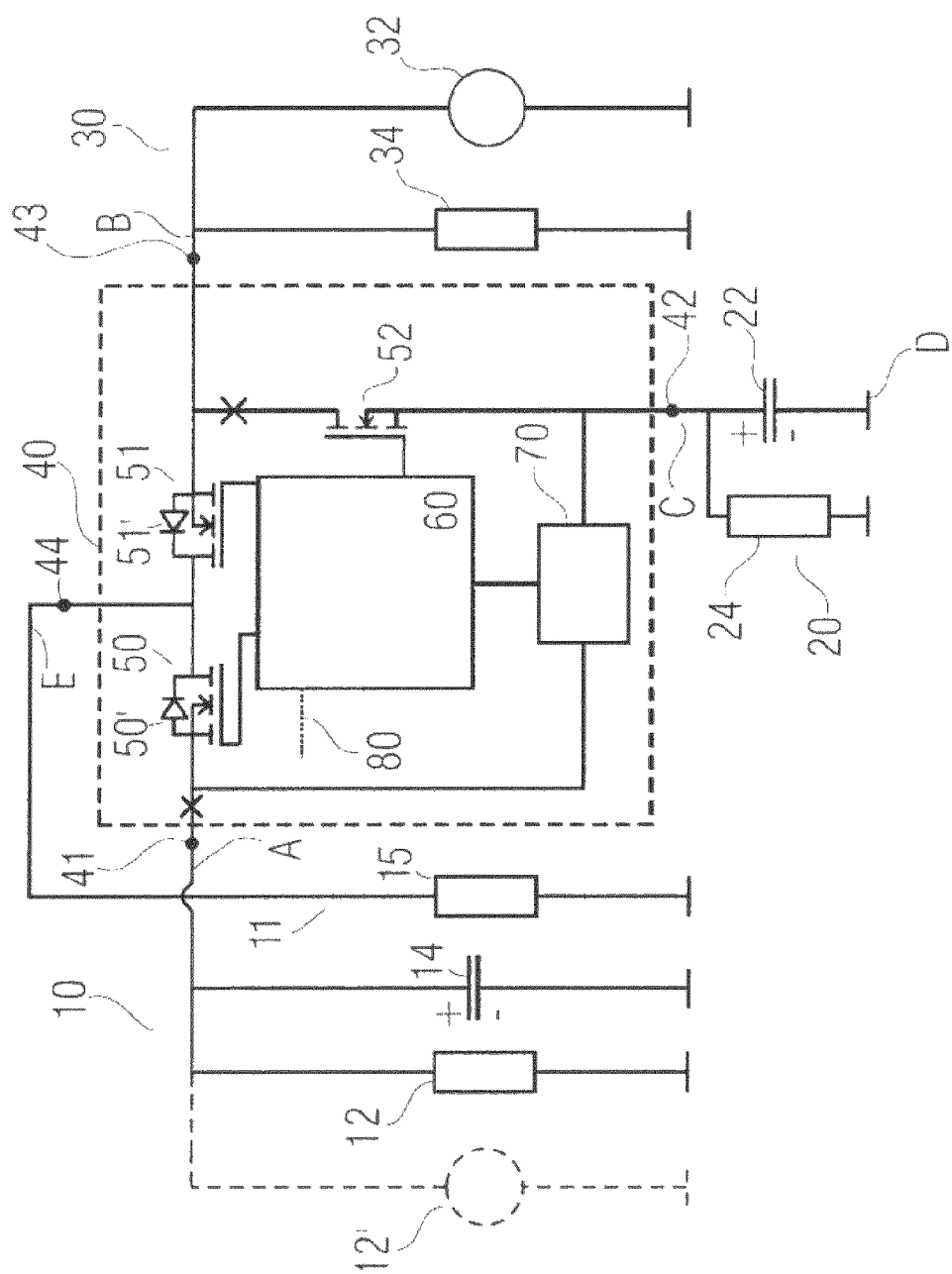

CONTROLLED CONNECTION OF MULTIPLE WIRING SYSTEM BRANCHES OF A VEHICLE

CROSS-REFERENCE TO RELATED APPLICATIONS

This application is a U.S. National Stage Application of International Application No. PCT/EP2015/053304 filed Feb. 17, 2015, which designates the United States of America, and claims priority to DE Application No. 10 2014 203 030.7 filed Feb. 19, 2014, the contents of which are hereby incorporated by reference in their entirety.

TECHNICAL FIELD

The present disclosure relates to the field of vehicle electrical power supply, and in particular describes a method and a control unit which permits a stabilized power supply.

BACKGROUND

Wiring systems are provided in motor vehicles for the operation of electrical consuming units, also known as loads. Some types of consuming unit are particularly sensitive to voltage drop-outs or voltage spikes in the supply voltage, for example wiring system electronics or also the lighting. If this kind of sensitive consuming unit is exposed to a voltage drop-out or a voltage spike, its function can be at least partially impaired. This can impair the operation of the vehicle and/or unwanted side-effects can occur such as a brief dimming of the lighting of the motor vehicle.

Dynamic electrical consuming units are, furthermore, present, particularly in modern vehicles, the operation of which can cause a heavy voltage drop-out, for example a starter motor of a start/stop module or a drive of an electrical steering as is used by parking assistants. These dynamic consuming units in particular are activated during operation of the vehicle, and not only at a first cold start or when shutting the vehicle down.

A wiring system topology with a plurality of subsidiary networks is presented in DE 10 2012 203 467 A1, in which amongst other things sensitive loads, whose function depends on the operating voltage, are supplied, and loads are also supplied whose operating voltage of 12-14 V can be variable (within limits) without functional disadvantages for the load concerned. It is, however, recognized that there is a need for improvement in the supply of sensitive loads, in particular during start procedures.

SUMMARY

The present disclosure describes a mode of approach with which the power supply in wiring systems of vehicles can be improved.

In some embodiments, a control unit (40) for the controlled exchange of electrical power between a first, a second, a third, and a fourth wiring system branch (10; 11; 20; 30) of a wiring system of a vehicle may include a first switching device (50), a second switching device (51), a third switching device (52), and a first, second, third and fourth terminal (41; 42; 43; 44), said terminals being configured for connection to the first, second, third and fourth wiring system branches (10, 20, 30, 11) respectively. The first switching device (50) is connected between the first terminal (41) and the fourth terminal (44). The second switching device (51) is connected between the fourth terminal (44) and the third terminal (43). The third switching device (52) is connected between the second terminal (42) and the third terminal (43).

In some embodiments, the first switching device (50) comprises a diode (50') that is connected in parallel with the first switching device (50), and whose forward direction points from the first terminal to the fourth terminal, and/or the second switching device (51) comprises a diode (51') that is connected in parallel with the switching device and whose forward direction points from the third terminal to the fourth terminal.

In some embodiments, the switching devices are electromechanical switches or semiconductor switches, in particular field effect transistors, bipolar transistors, or IGBTs.

In some embodiments, a switching arrangement (60) is connected to control inputs of the switching devices (50-52) for setting switch states of the switching devices (50-52). The switching arrangement (60) is configured to set at least one of the following switch states of the switching devices (50-52):

(a) a discharge protection state, in which the third switching device (52) is open and the first and the second switching devices (50, 51) are open or closed;

(b) an overvoltage protection state, in which the first, second and third switching devices (50-52) are closed, or in which the third switching device (52) is open and the first and the second switching devices are closed, or in which the first and the third switching devices (50, 52) are open and the second switching device (51) is closed;

(c) a loading protection state, in which the first and/or the second switching devices (50-51) are open;

(d) a charging state, in which the first and the third switching devices (50, 52) are closed, or in which the first switching device (50) is open and the second and the third switching devices (51) are closed, or in which the first and the second switching devices (50, 51) are closed and the third switching device (52) is open, or in which the first, the second and the third switching devices (50-52) are closed;

(e) a recovery state, in which the first switching device (50) is open and the second and the third switching devices (51, 52) are closed;

(f) a default state, in which the first switching device (50) is open and the second and the third switching devices (51, 52) are closed;

(g) a boot state, in which the first switching device (50) is closed, the second switching device (51) is open and the third switching device (52) is closed;

(h) an initial start state, in which the first switching device (50) is open and the second and the third switching devices (51, 52) are closed;

(i) a supplementary start state, in which the second switching device (51) is closed and the first and the third switching devices (50, 52) are closed; and (j) a fast-start state in which the first, the second and the third switching devices (50-52) are closed.

In some embodiments, a storage state detection unit is connected to the switching arrangement (60) and connected to a current sensor and/or to a voltage detection device in order to determine a degree of performance capacity of at least one of the energy stores. The storage state detection unit or the switching arrangement (60) is configured to generate a combustion engine switch-off recommendation when a degree of performance capacity is above a predetermined limit. The switching arrangement (60) is configured to set the supplementary start state (i) or the fast-start state (j) on receipt of a combustion engine switch-on command, in particular through an input that can be connected to a higher-level engine control unit.

In some embodiments, the control unit further comprises a speed input, wherein the limit at a first speed value presented to the speed input is smaller than it is at a second speed value that is larger than the first speed value.

In some embodiments, there is a current sensor between the first terminal (41) and the first switching device (50) and/or a current sensor between the third terminal (43) and the third switching device (52).

In some embodiments, there is a DC/DC converter (70) connected between the first terminal (41) and the second terminal (42). A current sensor is connected before or after the DC/DC converter (70) in order to detect the current flowing through the DC/DC converter.

In some embodiments, the first wiring system branch (10) is connected to the first terminal (41). The second wiring system branch (20) is connected to the second terminal (42). The third wiring system branch (30) is connected to the third terminal (43). The fourth wiring system branch (11) is connected to the fourth terminal (44). A combustion engine starter (12') and an electrical store in the form of a starter battery (14), in particular a lead accumulator, may be in the first wiring system branch (10). A further electrical store (22) in the form of a lithium accumulator or a supercapacitor arrangement and, optionally, at least one consuming unit with variable supply voltage is provided in the second wiring system branch (20). A generator (32) in the form of an alternator or a starter-generator, and at least one consuming unit with variable supply voltage, such as an electrical component of an air conditioning system or vehicle interior lighting, is provided in the third wiring system branch (30). A consuming unit (15) with a minimum operating voltage, such as an electrical steering device, vehicle lighting, an engine controller or vehicle electronics is comprised in the fourth wiring system branch (11).

BRIEF DESCRIPTION OF THE DRAWINGS

FIG. 1 is a schematic representation of an example vehicle wiring system with a control unit according to the teachings of the present disclosure.

DETAILED DESCRIPTION

The teachings of the present disclosure make it possible to stabilize a wiring system, even in the presence of electrical consuming units with a highly dynamic consumption, in an easy manner, particularly during start procedures. This also relates to start procedures from a stationary condition, and above all start procedures during travel and at vehicle speeds >20 km/h. The voltage stability is in particular improved during different types of start procedure and during recovery. Existing energy stores are employed effectively. In contrast to the prior art, a more robust and reliable stabilization of the wiring system can be realized, in which in particular an overload, for example overcharging or excessive operating temperatures of an additional energy store and/or at least one other component in the wiring system branches, is avoided. In addition, a disturbance of sensitive consuming units by consuming units whose operation can lead to voltage variations in the wiring system can be reduced.

In the present disclosure, a wiring system of a vehicle is described as separated or divided into a plurality of wiring system branches, at least in respect of function. In addition to wiring system branches with dynamic consuming units, which can cause voltage variations due to large and rapidly changing current consumption, there is a wiring system branch that can be separated from this, in which sensitive consuming units are provided. The voltage with which the sensitive consuming units are supplied and/or the voltage in the separable wiring system branch, can be kept more stable than the voltage in wiring system branches with dynamic consuming units, since, through the circuit topology proposed here, the wiring system branch provided with sensitive consuming units can be at least partially decoupled from other wiring system branches (in particular from wiring system branches with dynamic consuming units).

In particular, the wiring system branch provided with sensitive consuming units can be specifically supported through coupling with a wiring system branch that contains an energy store, while other wiring system branches that comprise dynamic consuming units are supplied from a different energy store or a different energy source. The control unit proposed here is equipped for controlled exchange between a plurality of wiring system branches, and implements the controllable coupling or decoupling of a wiring system branch with sensitive consuming units from other wiring system branches that comprise a dynamic consuming unit and/or an energy store (or other energy sources). Wiring system branches can be connected in order to connect dynamic consuming units to energy sources or energy stores, while, decoupled from this, sensitive consuming units are connected to other energy sources or energy stores. A wiring system is furthermore described in which the decoupling just mentioned is realized by means of the control unit described here.

Some embodiments may include a control unit for the controlled exchange of electrical power between a first, a second, a third and a fourth wiring system branch of a wiring system of a vehicle. The control unit may comprise a first, second and third switching device. The control unit further comprises a first, second, third and fourth terminal. These terminals are configured for connection to the wiring system branches, for example in that they are designed as an electrical plug-in or screwed contact, or as a cable segment that leads to the relevant wiring system branch (or at least one component of that).

The first switching device is connected between the first terminal and the fourth terminal. The second switching device is connected between the fourth terminal and the third terminal. The third switching device is connected between the second terminal and the third terminal. The switching devices are in particular connected in series between the relevant terminals, or join them. Through the three switching devices, a total of four wiring system branches can be separated from one another or joined together in a controlled manner. One of the switching devices is thus provided between the individual terminals, or connects them in a controlled manner. The terminals, or the switching devices, are in particular located at a positive voltage level, while a (common) ground potential is provided as a reference potential. The resulting topology can be considered as a five-pole network, comprising the four terminals and ground (or a corresponding ground terminal).

The first switching device can comprise a diode. This diode is connected in parallel with the first switching device. The forward direction of this diode points from the first terminal to the fourth terminal. Alternatively or in combination with this, the second switching device can comprise a diode. This diode is connected in parallel with the second switching device. The forward direction of this last-mentioned diode points from the third terminal to the fourth terminal. A diode connects the first and the fourth terminals, wherein the forward direction points from the first to the fourth terminal. Another diode connects the third and the fourth terminals, wherein its forward direction points from the third to the fourth terminal.

The diode can be a discrete component that is connected in parallel with the switching device. This is particularly the case when the switching device itself does not comprise such a diode as an inherent feature, such as a switching device in the form of an electromechanical switch, a bipolar transistor, an IGBT (Insulated Gate Bipolar Transistor) or a field effect transistor (in particular a MOSFET), whose source terminal is not directly connected to the substrate of the transistor. The diode can be provided inside the switching device, or may also be outside the switching device, wherein the diode is connected to the terminals concerned. The diode can further be provided as a substrate diode (in particular as a reverse diode) that is provided in the substrate of a transistor, in particular of a field effect transistor such as a MOSFET. MOSFETs with reverse diodes as parallel-connected diodes (n-MOSFETs in particular) are preferably used as the switching device, although electro-mechanical switches can also be used, for example if less than about one million switching operations are to be expected in the service life of the switch (depending on the application).

A switching device (in particular the first switching device) implemented as a MOSFET can comprise a source that is connected to the first terminal, and can comprise a drain that is connected to the fourth terminal. A further switching device implemented as a MOSFET (in particular the second switching device) can comprise a source that is connected to the third terminal, and can comprise a drain that is connected to the fourth terminal. The drains of the switching devices are connected together, the fourth terminal being connected to their connecting point. The MOSFETs comprise reverse diodes, whose forward directions point toward the fourth terminal. The third switching device can be implemented as an electromechanical switch or as a semiconductor switch. A diode in parallel with the fourth switching device is optional, and under some circumstances may be omitted. It is also possible for two diodes to be arranged in parallel with the third switching device. These can be connected together in an anti-serial manner. The forward direction of the diode or the diodes parallel to the third switching device can point to the third terminal or can point away from it.

The switching devices can be electromechanical switches or semiconductor switches. In particular, the switching devices are field effect transistors, bipolar transistors or IGBTs. The switching devices of the control unit can be of different types or of the same type. Type refers here to the previously mentioned embodiments of the switching devices. In particular, the third switching device can be implemented as an electromechanical switch. The first and/or the second switching devices are preferably implemented as semiconductor switches, in particular as MOSFETs, wherein in specific forms of embodiment at least one of the first and the second switching device can be designed as electromechanical switches.

The control unit can be equipped with a switching arrangement that sets the switch states of the switching devices. The switching arrangement is connected to control inputs of the switching devices for setting switch states of the switching devices. The switching arrangement is configured to set at least one of the following switch states of the switching devices:

(a) A discharge protection state in which the third switching device is open and the first and the second switching devices are open or closed.

In this state, an energy store, which is connected to the second terminal, is protected from deep discharge and from under-voltage. A further discharge of this energy store is furthermore prevented.

The discharge protection state is set when, for example, the voltage at the second terminal lies below a predetermined limit, or the charging state (SoC, State of Charge) is under a predetermined limit. For this purpose, a voltage detection unit can be provided, connected to the second terminal, in order to determine the voltage there with respect to ground. The voltage detection unit is connected to the switching arrangement in order to transfer the relevant voltage value to it.

(b) An overvoltage protection state in which the first, second and third switching devices are closed, or in which the third switching device is open and the first and the second switching devices are closed. Alternatively, in this state, the first and the third switching devices are open and the second switching device is closed.

In this state an energy store that is connected to the second terminal is protected from being overloaded (from overvoltage). A further charging of this energy store is furthermore prevented in this way. The energy store is furthermore discharged by transferring power to other terminals, in particular through the transfer of power to the third (or also to the first) terminal.

The overvoltage protection state is set when the voltage at the second terminal lies above a predetermined limit. The voltage detection unit can be used for this purpose. The overvoltage protection state can also be set if the voltage at the third terminal lies above a predetermined limit. In this case, the first and the third switching devices are opened or are open.

(c) A loading protection state in which the first and/or the second switching devices are open. In this state the transfer of power (charge) to an energy store that is connected to the first terminal is prevented. The frequency of the charging is reduced in this way, whereby the service life of the energy store that is connected to the first terminal is increased. The switch state of the first switching device can be used to define when the previously mentioned energy store is charged and when charging is prevented.

(d) A charging state in which the first switching device is closed. As a result, the charging states in the sense of state (c) are limited, wherein charging can only take place in the charging state and charging is prevented when the first switching device is open (there is no charging state) in order to protect the energy store (in particular a lead-acid battery connected to the first terminal) through the reduced number of charging procedures. The charging state is set when a charge command is issued by a higher-level control unit (that is connected to the switching arrangement).

(e) A recovery state in which the first switching device is open and the second and the third switching devices are closed. In this state, power can be transferred from the third terminal, to which, for example, a generator (or starter-generator) can be connected, to other terminals, such as to the second or fourth terminal. The power can be transferred from the third terminal to loads or to an energy store that are connected to the second or fourth terminals. The generator (or starter-generator) can here generate electrical power, recovered power for example, that is transferred by the control unit to loads or energy stores. This power is typically in the range between 3-5 kW (at operating voltages of 12 V-14 V) or also (at operating voltages of 40 V or more) up to 8 kW or 20 kW (or even more), in order to generate braking force for the vehicle and thus to convert kinetic energy of the vehicle into electrical power.

The recovery state is set when the vehicle is braked, generating recovered power, in particular by means of the generator that is connected to the third terminal.

(f) A default state in which the first switching device is open and the second and the third switching devices are closed.

The open first switching device prevents the second energy store discharging to the first energy store. A charging current to the first energy store is prevented. Supply of the wiring system when idle (i.e. in the default state) by the second energy store is furthermore enabled.

This state is set before travel begins, or is set when the vehicle is switched off. This state corresponds to an idling mode of the vehicle.

(g) A boot state in which the first switching device is closed, the second switching device is open and the third switching device is closed.

This state permits the transfer of power from the second terminal (or from the energy store connected to it) to the third terminal (in particular to the electric machine connected to it, which can operate as a motor, e.g., a booster motor). Electrical power can be transferred to the booster motor which provides traction power. The boot state is set when an additional electrical drive is active. The additional electrical drive is designed as a booster motor.

(h) An initial start state in which the first switching device (50) is open and the second and the third switching devices (51, 52) are closed.

In this case, power is transferred from the second terminal (such as from a battery connected to it) to the third terminal, in particular to a starter that is connected to it or to a starter-generator that is connected to it, or to a booster motor that is connected to it and which generates traction power and which is designed as an electrical machine. Alternatively, the first energy store can drive a starter, both of them being in the same wiring system branch (connected to the first terminal). Depending on operating parameters such as the temperature of the combustion engine, the possibility described first or the alternative described second can be implemented.

Alternatively, the starter-generator connected to the third terminal and the starter connected to the first terminal can simultaneously or synchronously bring about the start procedure of the combustion engine, wherein the corresponding switching devices are closed for this purpose.

This state is set when the vehicle, and in particular its combustion engine, are started.

(i) A supplementary start state in which the second switching device is closed and the first and the third switching devices are closed. This furthermore enables the transfer (independently of this) of power from the second terminal to the fourth terminal, for example to transfer power from an energy store that is connected to the second terminal to sensitive consuming units that are connected to the fourth terminal.

This state is set when the vehicle, and in particular its combustion engine, are started, in particular in a moving vehicle, preferably at speeds below a predetermined limit of around 50 km/h or 20 km/h or even 5 km/h.

During start procedures, the starter can receive power from the first energy store. As a further variant, a starter at the third terminal can be used for starting. The starter here receives power from the second energy store.

(j) A fast-start state in which the first, the second and the third switching devices (50-52) are closed. This permits a flow of power from the first and second terminals to the third terminal. In this way, power can be transferred from an energy store that is connected to the first terminal as well as power from a (further) energy store that is connected to the second terminal to the starter or starter-generator and/or booster motor that is connected to the third terminal.

The fast-start state is set when the vehicle is moving, in particular at a speed G, and the combustion engine is started. The speed G is above a limit that is greater than the limit defined for the supplementary start state, and is at least 20 km/h, 50 km/h, 80 km/h or 90 km/h, or even at least 120 km/h. Above a further limit, which is greater than the limits just mentioned, a start procedure is preferably not carried out. Alternatively, the fast-start state can also be set independently of the speed G.

In particular the charging state, the voltage, the maximum available current or the internal conductance of the first and second energy stores is detected (as a degree of performance capacity). The internal conductance may be the internal conductance of the energy store concerned, but can also be the total of the internal conductances of the energy store concerned and the conductance of further components such as the switching devices and/or electrical contact elements and/or electrical cables. A determination is made for at least one of said magnitudes as to whether this lies above a predetermined limit, below a predetermined limit or outside a predetermined interval. If this is true, the fast-start state is enabled and set according to a corresponding command, or is set directly. Said magnitudes can be determined by a storage state detection unit which is connected in particular to a switching arrangement that controls the switch state of the switching device. The storage state detection unit can be connected to at least one current sensor that detects the current that is flowing in the control unit and, in particular, at a terminal or at an energy store, and/or can be connected to at least one voltage detection device that acquires a voltage or a potential in the control unit, in particular at one of the energy stores or at one of the terminals.

If it is detected that the first and/or second energy store is capable of carrying out a start procedure, or of making the energy required for that available, then a combustion engine can be switched off in the travelling vehicle, where switching off the combustion engine is prevented if the first and/or second energy store is not capable of carrying out a start procedure or of supporting it through the provision of energy. Whether the first and/or second energy store is capable of carrying out a start procedure or of supporting it is determined on the basis of the magnitudes referred to in the previous section, in particular through a comparison with the relevant predetermined limits. This makes it possible to switch the combustion engine of a travelling vehicle off and to coast (i.e. roll forward without drive) if it has previously been determined that the energy store is capable of restarting the combustion engine. The fast-start state in particular is set when restarting. Preferably only one of the energy stores (i.e. the first or the second energy store) is used at first to supply the starter (which preferably is connected to the third terminal). Both the energy stores can, furthermore, be used in order to carry out the start procedure together, in particular if it is determined that one (or two) start procedures have been attempted unsuccessfully with only one energy store.

The control unit may include a storage state detection unit which is connected to the switching arrangement. The storage state detection unit is further connected to a current sensor and/or to a voltage detection device, and is configured to determine a degree of performance capacity of at least one of the energy stores, in particular with reference to the data of the current sensor or of the voltage detection device. The storage state detection unit or the switching arrangement is configured to generate a combustion engine switch-off recommendation when a degree of performance capacity is above a predetermined limit. The switching arrangement sets the supplementary start state (i) or the fast-start state (j) preferably on receipt of a combustion engine switch-on command on.

The control unit may include an input for connection to a higher-level engine control unit that generates the combustion engine switch-off command and the combustion engine switch-on command. In addition, the control unit may include an output at which the combustion engine switch-off recommendation can be asserted, in particular at the higher-level engine control unit. The control unit further preferably has a speed input through which the control unit can receive speed data of the vehicle. When activating the states (i) and (j) (or other states), the control unit can provide an additional requirement to be satisfied, namely that the speed is above a predetermined limit (or under a predetermined limit).

The limit, above which the degree of performance capacity must lie in order to generate a switch-off recommendation, depends on the speed of the vehicle, which is presented to the speed input. The greater the speed, the higher the limit, since at higher speeds attempts to start the combustion engine that remain unsuccessful are more critical than they are at lower speeds. Alternatively, or in combination with the speed, an upcoming incline in the drive path can be used as a magnitude that affects the limit.

The degree of performance capacity reflects the quantity of energy in the relevant energy store that can be called on, and may indicates the number of start procedures of the combustion engine for which the available quantity of energy is sufficient. The above-mentioned limit can be an integral multiple of a quantity of energy that is drawn from the energy store to carry out a start procedure, possibly with the addition of a predetermined safety margin. The integral multiple can, for example, be (at least) 4 at a speed of more than 80 km/h, can be 3 at a speed of more than 40 km/h (but not more than 80 km/h), and can potentially be 2 at speeds of below 40 km/h, for example. Instead of the given speed values, a plurality (2, 3 or more) of different speed intervals (closed or open intervals) can be used, which are assigned to different, positive integers N, wherein the numbers N correspond to the previously quoted multiples.

The control unit can also comprise an activity input, at which the control unit can receive a signal that reflects the activity state of the combustion engine. The inputs and outputs described here can be interfaces, e.g., bus interfaces, and may be physically integrated into one or a plurality of interface elements.

If a current leaving from the first wiring system branch (or from the first terminal) (in particular to the second or third wiring system branch, or the second or third terminal) is detected, and is above a predetermined limit, or if a voltage is measured at the fourth terminal that is below a predetermined limit, the second switching device is opened. As a result, the third terminal, to which the starter or starter-generator is connected, only continues to receive power from the second energy store, while the first energy store is relieved and can supply the fourth wiring system branch through the fourth terminal. The first switching device here remains closed. If sensitive loads or sensitive consuming units are connected to the fourth terminal, their supply is ensured and voltage drop-outs are avoided, since the sensitive consuming units are decoupled from the starter (as a disruptive load) by opening the second switching device, and receive their own (separate) voltage supply in the form of the first energy store.

It can be provided that at speeds which, as noted above, lie above a limit speed, a start procedure is to be carried out by a starter/generator in the third wiring system branch. In order to provide the energy for the start procedure, the second energy store is used. In order to be able to continue to supply the fourth wiring system branch without disturbance, the second switch is opened, whereby an effect from the start procedure is avoided.

Since the energy for the start procedure is drawn from the second energy store, the degree of performance capacity of the second energy store is first checked (with reference to the charging state, the terminal voltage, the aging status, temperature and/or internal resistance). If the degree of performance capacity is adequate (lies above a predetermined limit) then the second switch is opened and the start procedure is carried out. The degree of performance capacity to be satisfied further becomes all the higher as the speed of the vehicle is greater. This ensures that more than one start procedure (in close sequence) can safely be carried out with the second energy store, in particular at high speeds. Start procedures in close sequence occur when a first (or also a following) start procedure does not lead to a successful start of the combustion engine.

The degree of performance capacity of the first energy store is checked in a similar manner, in order to be sure that this can supply the fourth wiring system branch while the second switch is open. If the degrees of performance capacity of the second and/or the first energy stores are not sufficient in this sense, a combustion engine switch-off recommendation is not issued, that is to say the combustion engine is not switched off. When the degree of performance capacity is too low, there is thus no forward movement state with the combustion engine switched off. The degree of performance capacity to be satisfied is all the higher, the greater is the speed of the vehicle. This ensures that more than one start procedure (in close sequence) can safely be carried out with the second energy store, in particular at high speeds. Start procedures following each other in close sequence occur when a first (or also a following) start procedure does not lead to a successful start of the combustion engine.

Some embodiments may include a current sensor between two terminals, e.g., between a terminal and a switching device. The current sensor can comprise an output that is connected to the switching arrangement. A current sensor can be connected between the first terminal and the first switching device. Alternatively or in combination with this, a current sensor can be connected between the third terminal and the third switching device. The locations at which current sensors can be present are indicated with an X in FIG. 1.

Current paths and/or switch states, or the switching devices, can be monitored by means of the current sensors, for example. The energy stores can further be monitored, in particular their performance capacity, for example with reference to the charging state, the aging state, the temperature, the internal resistance and/or the terminal voltage, in order, for example, to determine a degree of performance capacity.

This means that determination of the performance capacity for coasting operation (with the combustion engine switched off) applies to all components of the four wiring system branches. These comprise: electrical stores, switching devices, contacts, electrical connections, cables, electric machines and the control units themselves.

The control unit can, further, comprise a DC/DC converter connected between the first terminal and the second terminal. The DC/DC converter may be a two-directional converter. This can support an exchange of power between the first and the second terminals, in particular in order to transfer power from one of said terminals to an energy store that is connected to another of said terminals. The first energy store can be charged with the DC/DC converter from the second energy store. A charging current can, further, also be transferred in the opposite direction from the DC/DC converter, in order to precharge the second energy store. A current sensor may be connected before or after the DC/DC converter, in order to detect the current flowing through the converter.

A vehicle wiring system is further described, which is fitted with a control unit described here. By means of the control unit, the wiring system branches of the vehicle wiring system can be disconnected or connected in a controlled manner.

The vehicle wiring system includes the first, second, third and fourth wiring system branches. The first wiring system branch is connected to the first terminal. The second wiring system branch is connected to the second terminal. The third wiring system branch is connected to the third terminal. The fourth wiring system branch is connected to the fourth terminal. The connection between a wiring system branch and the corresponding terminal can be a releasable or non-releasable electrical connection, for example, on the one hand, a plug-in or screw connection, or on the other hand a soldered connection.

Cables can be used for connecting the first energy store that permit a physical distance of more than one meter from the further components. The cables may be made of aluminum or of copper.

A combustion engine starter is provided in the first wiring system branch, e.g., a pinion starter. An electrical energy store, for example in the form of a starter battery, is further provided in the first wiring system branch. This may be implemented as a lead accumulator (or as a lithium ion accumulator).

At least one consuming unit with a variable supply voltage may be present in the first wiring system branch. Consuming units whose supply voltage can vary without their operation being disturbed lastingly or temporarily are considered to be consuming units with variable supply voltage. Interior lighting or an electrical component of an air conditioning system (or screen heater) can, for example, be supplied with a variable voltage, where although the output power does vary with the voltage, operation nevertheless is not fundamentally disturbed by a variable supply voltage.

Consuming units with variable supply voltage can thus even exhibit (brief) gaps in operation as a result of a variable supply voltage, which do not however have any effects on safety-relevant functions of the vehicle. If, for example, the interior lighting or the air conditioning stops temporarily (perhaps for about 100 ms, about 1 s or for about 10 s), the driver can visually orient himself again after the failure, without a safety problem having resulted from the failure. An air conditioning system or a screen heater is a converter of electrical energy, whose output magnitude exhibits and integrating property (heat or cold accumulates to a degree over time). A consuming unit with variable supply voltage is thus also a converter of electrical energy, whose reduced power or failure for a period of time does not lead to a significantly varying output magnitude (such as the interior temperature) as a result of the integrative character.

A further electrical store is provided in the second wiring system branch. Examples include a lithium accumulator, a supercapacitor arrangement, and lead accumulators. A supercapacitor arrangement is fitted with at least one supercapacitor ("supercap"). The supercapacitor arrangement can comprise one or a plurality of supercapacitors, wherein, with a plurality of supercapacitors, these can be connected in parallel and preferably in series. The supercapacitor arrangement can further comprise DC/DC converters in order, on the basis of the capacitor voltage, to generate an output voltage that differs from the capacitor voltage, in particular in order to compensate at least partially for a reduction in the capacitor voltage. These converters can correspond to the converters described here, whose connection may in some cases have to be modified.

The further electrical store can have a lower storage capacity than the electrical store in the first wiring system branch. In the second wiring system branch, furthermore, at least one consuming unit with variable supply voltage is optionally provided. The consuming units with variable supply voltage mentioned here (interior lighting, electrical components of an air conditioning system, electric heating, screen heating, etc.) may be considered here as the consuming unit with variable supply voltage in the second wiring system branch.

At least one consuming unit with variable supply voltage is provided in the third wiring system branch, such as an electrical component of an air conditioning system or vehicle interior lighting, or another consuming unit with variable supply voltage as is described herein, such as a consuming unit with variable supply voltage of the type that can be present in the second wiring system branch. An (electromechanical) generator is further provided in the third wiring system branch. This can be in the form of an alternator or a starter-generator, or can in general be an electric machine that for example generates traction power, for example in order to support the drive or to move the vehicle, in particular in the form of the booster motor.

Starters or starter-generators can also be considered as consuming units with variable supply voltage, since these can also carry out their function during voltage drop-outs (of up to −60%, −30% or −20% of the rated operating voltage). The rated operating voltage can be 12 or 14 V. A consuming unit with a minimum operating voltage is provided in the fourth wiring system branch. This is also considered as a sensitive load or sensitive consuming unit.

This consuming unit is, for example, an (additional) electrical steering device or steering reinforcement, vehicle lighting, a cockpit indicator or cockpit lighting, a combustion engine controller or vehicle electronics. Sensitive consuming units perform a safety-relevant or operationally relevant function in the vehicle that relates to driving, braking, steering or signaling (to the outside), and/or other functions necessary for proper operation of the vehicle (in respect of compliance with regulations of means of transport in the sense of a general inspection or safety inspection in the sense of Section 29 of the German road traffic regulations (StVZO)), and also including driver assistance systems.

An engine control electronic system, for example, is a consuming unit with a minimum operating voltage, since voltage drop-outs can lead to at least temporary failure of the motor control function or to incorrect functions that are necessary for safe operation of the vehicle, whereas in the case of interior lighting, although its function is reduced during voltage drop-outs, the reduction in the illumination is however not safety-relevant. In certain cases, consuming units that serve convenience functions may also be considered as sensitive consuming units if their operation is temporarily halted by a voltage drop-out, as is the case for entertainment electronics such as music equipment, navigation devices and the like.

The energy store of the second wiring system branch can be a short-term store whose capacity is significantly lower than the capacity of the first wiring system, such as by a factor of at least ½, ⅒ or 1/20 or, particularly preferably, at least 1/50 or 1/100, than the capacity of the energy store of the first wiring system branch. The energy store of the second wiring system branch can be a supercapacitor arrangement or a lithium or NiMH accumulator, and lead accumulators can also be used to a limited extent. The energy store of the first wiring system branch can be a lead or NiMH accumulator. If a supercapacitor arrangement is used, it may have a capacitance of at least 50 F, 300 F, 500 F, 1000 F, of at least 5000 F, 10 000 F, or 12 000 F.

The control unit described here can be provided for voltages less than 60 V, for example for wiring system branches with 12, 14, 24 or 48 V as the rated voltage.

The consuming units in the first (or also in the third) wiring system branch, e.g., the starter or the starter/generator of the combustion engine, can further be an electric machine (for generating traction power and/or for recovery) or an electric drive that in particular demands more than 50, 100, 200, 500 or 1000 amperes for operation, such as an electrical steering device.

FIG. 1 is a schematic representation of a vehicle wiring system with a first wiring system branch 10, a second wiring system branch 20, a third wiring system branch 30, and a fourth wiring system branch 11. The wiring system branches 10, 20, 30, and 11 are connected together by means of a control unit 40. The first wiring system branch 10 comprises a consuming unit 12 (with variable supply voltage) or a starter consuming unit 12', as well as a first electrical energy store 14, for example in the form of a lead-acid accumulator. The first electrical energy store 14 is used as a starter battery. The consuming unit 12 or 12' is an electrical consuming unit with a high current demand capable of generating voltage drop-outs in the wiring system. The consuming unit 12' is designed as a starter motor for a combustion engine, particularly as a belt or a pinion starter.

The second wiring system branch includes an electrical energy store 22, implemented for example as a lithium accumulator. The energy store 22 can, alternatively, be a supercapacitor arrangement. The consuming unit 24 can, for example, be realized as a data controller or a state monitoring unit that is assigned to the second power store 22 in order to monitor at least one operating parameter of the second energy store 22, to control or regulate, for example, the charging state.

The third wiring system 30 comprises a generator 32 (for example an alternator or a starter/generator or an electric machine, in particular for converting electrical power into traction power or vice versa for recovery) as well as a consuming unit 34. Reference sign 32 indicates in particular a booster motor that generates traction power and that is constructed as an electrical machine.

The consuming unit 34 corresponds to a consuming unit with variable supply voltage.

A control unit 40 is connected to the first, second, third, and fourth wiring system branches 10, 20, 30, and 11. The control unit connects in particular the four wiring systems to one another. The control unit here connects a supply potential, e.g., the positive supply potential of the four wiring system branches to one another in a controlled way. In the topology as illustrated in FIG. 1, the wiring system branches have a common further supply potential and/or ground. The control unit comprises a first terminal 41, a second terminal 42, a third terminal 43, and a fourth terminal 44 for connection of the wiring system branches 10, 20, 30, 11 to the control unit 40. The first terminal 41 is configured for connection to the first wiring system branch 10, the second terminal 42 is configured for connection to the second wiring system branch 20, the third terminal 43 is configured for connection to the third wiring system branch 30 and the fourth terminal 44 is configured for connection to the fourth wiring system branch 11.

The four terminals 41-44 provided as power terminals are implemented as electrical contacts, for example as plug-in contacts and/or screwed contacts, and are designed in particular in terms of their cross section and material to carry current intensities of at least 50 amperes, in particular of at least 100 amperes and preferably of at least 200 amperes or at least 600 or 1000 amperes.

The control unit 40 comprises a first switching device 50, a second switching device 51, and a third switching device 52. The first, second, and third switching devices may be constructed as a MOSFET (n-MOSFET). Alternatively, the third switching device 52 can be constructed as an electromechanical, controllable switch such as a relay (power relay) or contactor. A diode 50' is also drawn in the first switching device 50, in particular constructed as a substrate diode (preferably as a reverse diode). The diode 50' is illustrated to permit a possible flow of current from the first wiring system branch 10 to the fourth wiring system branch 11 which takes place even without drive (e.g., in the open switch state) of the switching device 50 if the voltage in the third wiring system branch 30—taking into account the forward bias voltage of the diode concerned—is appropriately lower than the voltage in the first wiring system branch 10 (and the second switching device 51 is closed).

A diode 51' may be in parallel to the second switching device 51, whose forward direction points from the third terminal 43 to the fourth terminal 44. Current can flow from the second terminal 42 to the fourth terminal 44 through this diode even without drive (e.g., in the open switch states) of the switching device 51. The switching device 50 should be open for this purpose.

If, therefore, the voltage in the fourth wiring system branch 11 is lower than the voltage in the first wiring system branch 10, the fourth wiring system branch 11 is supplied from the voltage of the first wiring system branch 10 (e.g., from its energy store 14), independently of the switch state of the first switching device 50. If the voltage in the fourth wiring system branch 11 is lower than the voltage in the third wiring system branch 30, the fourth wiring system branch 11 is supplied from the voltage of the third wiring system branch 10 (e.g., from its energy store 22), independently of the switch state of the second switching device 51. A flow in the opposite direction of flow is only possible when switching device 50 or 51 is closed. The third switching device 52 switchably connects the second terminal to the third terminal. The fourth wiring system branch 11 can receive current from the second wiring system branch 20 through this when the third switching device 52 is closed.

A diode in the form of a discrete diode can be connected in parallel with the third switching device 52, or a substrate diode (in particular a reverse diode) can act in parallel with the third switching device. In the case just mentioned, the third switching device is a MOSFET (in particular an n-MOSFET), which comprises the reverse diode. The diode that is in parallel with the third switching device 52 has a forward direction that points from the second terminal 42 to the third terminal 43. Current can flow from the second wiring system branch into the third wiring system branch through this even without drive of the third switching device 52 (e.g., in an open switch state).

An optional DC-DC converter 70 connects the first terminal to the second terminal in a bidirectional manner, so that at a high voltage level, or when there is an excess of energy (e.g., at a high charging state) in the second wiring system branch 20, current can flow from the second wiring system branch 20 through the DC-DC converter. Current can, further, flow in the opposite direction if the second wiring system branch 20 has a low voltage level. A high voltage level refers to a voltage that lies above a predetermined upper limit, such as the maximum voltage of the energy store 22. A low voltage level refers to a voltage that lies below a predetermined lower limit of the energy store 22. The DC-DC converter comprises a control input 80.

The switching devices 50-52 each comprise a control input, in particular a gate terminal, which is connected to the switching arrangement 60. The switching arrangement 60 controls the switch states of the first, second and third switching devices 50, 51, and 52.

The topology illustrated in FIG. 1 in the form of a five-pole network comprises poles A-E. Pole A is located at the transition between the control unit 40 and the first wiring system branch 10. Pole C is located at the transition between the control unit 40 and the second wiring system branch 20, e.g., the positive terminal of the second energy store 22. Pole B is located at the transition between the control unit 40 and the third wiring system branch 30. Pole D is provided as a ground connection for the wiring system branches 10, 20, 30, and 11. Pole E is located at the transition between the control unit 40 and the fourth wiring system branch 11.

Current sensors may be provided at all those points that are marked with a cross in order to detect the current flowing there. A voltage detection device (not illustrated, for a better overview) can further be provided, connected to the (positive) terminal of at least one wiring system branch. All the wiring system branches may be connected to a voltage detection device of this sort. The voltage detection device and the current sensors have an output that is connected to a signal input of the switching arrangement 60. The switching arrangement 60 is configured to process the relevant signals and to control the switching devices 50-52 in response to the signals. The voltage detection device can comprise A/D converters that are provided in the switching arrangement 60. The A/D converters are connected by signal lines to the relevant (positive) contact points of the wiring system branches, in order to detect their potential with respect to ground or differentially. A current sensor can be connected between the second switching device and the third terminal, between the third switching device and the third terminal and between the second and the third switching devices on the one hand and the third terminal on the other hand.

LIST OF REFERENCE SIGNS 10, 20, 30, 11 first-fourth wiring system branch
12 consuming unit with variable supply voltage (optional)
12' consuming unit (starter motor or starter (e.g. pinion starter)
14 starter battery
22 further electrical store
24, 34 consuming unit with variable supply voltage
32 starter or starter/generator or starter/generator with booster motor
40 control unit
41-44 first to fourth terminal
50-52 first to third switching device
50', 51' diode
60 switching arrangement for controlling the switching devices
70 DC/DC converter
80 data input
A-E pole
X example of location for current sensor

What is claimed is:

1. A control unit for the exchange of electrical power between a first, a second, a third, and a fourth wiring system branch of a wiring system of a vehicle, comprising:
    a first switching device,
    a second switching device,
    a third switching device, and
    a first, second, third, and fourth terminal configured for connection to the first, second, third and fourth wiring system branches respectively,
    wherein the first switching device is connected between the first terminal and the fourth terminal,
    the second switching device is connected between the fourth terminal and the third terminal, and
    the third switching device is connected between the second terminal and the third terminal.

2. The control unit as claimed in claim 1, wherein the first switching device comprises a diode connected in parallel with the first switching device, and whose forward direction points from the first terminal to the fourth terminal.

3. The control unit as claimed in claim 1, wherein the second switching device comprises a diode connected in parallel with the switching device and whose forward direction points from the third terminal to the fourth terminal.

4. The control unit as claimed in claim 1, wherein the switching devices are electromechanical switches or semiconductor switches.

5. The control unit as claimed in claim 1, wherein the switching devices are elements chosen from the group consisting of: field effect transistors, bipolar transistors, and IGBTs.

6. The control unit as claimed in claim 1, further comprising a switching arrangement connected to control inputs of the switching devices for setting switch states of the switching devices, wherein the switching arrangement is configured to set at least one of the following switch states of the switching devices:
    (a) a discharge protection state, in which the third switching device is open;
    (b) an overvoltage protection state, in which the first, second and third switching devices are closed, or in which the third switching device is open and the first and the second switching devices are closed, or in which the first and the third switching devices are open and the second switching device is closed;
    (c) a loading protection state, in which the first and/or the second switching devices are open;
    (d) a charging state, in which the first and the third switching devices are closed, or in which the first switching device is open and the second and the third switching devices are closed, or in which the first and the second switching devices are closed and the third switching device is open, or in which the first, the second and the third switching devices are closed;

(e) a recovery state, in which the first switching device is open and the second and the third switching devices are closed;

(f) a default state, in which the first switching device is open and the second and the third switching devices are closed;

(g) a boot state, in which the first switching device is closed, the second switching device is open and the third switching device is closed;

(h) an initial start state, in which the first switching device is open and the second and the third switching devices are closed;

(i) a supplementary start state, in which the second switching device is closed and the first and the third switching devices are closed; and (j) a fast-start state in which the first, the second and the third switching devices are closed.

7. The control unit as claimed in claim 6, further comprising a storage state detection unit connected to the switching arrangement and connected to a current sensor and/or to a voltage detection device in order to determine a degree of performance capacity of at least one of the energy stores,
wherein the storage state detection unit or the switching arrangement is configured to generate a combustion engine switch-off recommendation when a degree of performance capacity is above a predetermined limit, wherein the switching arrangement is configured to set the supplementary start state or the fast-start state on receipt of a combustion engine switch-on command, in particular through an input that can be connected to a higher-level engine control unit.

8. The control unit as claimed in claim 7, further comprising a speed input, wherein the limit at a first speed value presented to the speed input is smaller than it is at a second speed value that is larger than the first speed value.

9. The control unit as claimed in claim 1, further comprising a current sensor between the first terminal and the first switching device.

10. The control unit as claimed in claim 1, further comprising a current sensor between the third terminal and the third switching device.

11. The control unit as claimed in claim 1, further comprising:
a DC/DC converter connected between the first terminal and the second terminal, and
a current sensor connected before or after the DC/DC converter in order to detect the current flowing through the DC/DC converter.

12. A vehicle wiring system comprising:
a control unit for the exchange of electrical power between a first, a second, a third, and a fourth wiring system branch of a wiring system of a vehicle, comprising:
a first switching device,
a second switching device,
a third switching device, and
a first, second, third, and fourth terminal configured for connection to the first, second, third and fourth wiring system branches respectively,
wherein the first switching device is connected between the first terminal and the fourth terminal,
the second switching device is connected between the fourth terminal and the third terminal, and
the third switching device is connected between the second terminal and the third terminal,
the first wiring system branch connected to the first terminal;
the second wiring system branch connected to the second terminal;
the third wiring system branch connected to the third terminal (43);
the fourth wiring system branch connected to the fourth terminal; and
wherein a combustion engine starter and an electrical store coupled to the first wiring system branch;
a further electrical store coupled to the second wiring system branch;
a generator and at least one consuming unit with variable supply voltage coupled to the third wiring system branch; and
a consuming unit with a minimum operating voltage coupled to the fourth wiring system branch.

* * * * *